United States Patent

[11] 3,580,061

[72] Inventors William H. Neuman
Cedar Falls, Iowa;
James A. Repella, Madison Heights, Mich.
[21] Appl. No. 53,333
[22] Filed Jan. 16, 1970
[45] Patented May 25, 1971
[73] Assignee Federal-Mogul Corporation
Southfield, Mich.

[54] SEAL-TESTING DEVICE
3 Claims, 3 Drawing Figs.
[52] U.S. Cl. .................................................. 73/88R,
33/174L, 73/37, 73/89, 73/141R
[51] Int. Cl. .............................................. G01n 3/08
[50] Field of Search .......................................... 73/100,
120, 37, 37.5, 40, 46, 49.4, 49.8, 88, 81, 89;
33/174L, 178e, 178R, 141

[56] References Cited
UNITED STATES PATENTS
3,188,855  6/1965  Dega ............................. 73/37
3,286,512 11/1966  Jagger et al. ................... 73/88
3,447,361  6/1969  Schmitt .......................... 73/88

Primary Examiner—Richard C. Queisser
Assistant Examiner—Marvin Smollar
Attorney—Owen, Wickersham, Erickson ABSTRACT: A device for indicating whether a lip-type seal may be satisfactorily reinstalled. A simulated shaft and seal retaining environment is provided, and the simulated shaft has a plurality of radially extending members normally urged radially outwardly at a predetermined pressure. When the seal urges all of these members in at a somewhat greater pressure, a series circuit is completed to give a signal. The seal is deemed satisfactory if the signal remains in operation for a predetermined time interval.

PATENTED MAY 25 1971

INVENTORS
WILLIAM H. NUEMAN
JAMES A. REPELLA
BY

*Owen, Wickersham & Erickson*

ATTORNEYS

INVENTORS
WILLIAM H. NUEMAN
JAMES A. REPELLA
BY
*Owen, Wickersham & Erickson*
ATTORNEYS

SEAL-TESTING DEVICE

This invention relates to a device for testing the operability of a shaft seal of the lip type.

The general rule in the shaft seal industry is never to reinstall a lip-type of seal, one it has been removed. There are good reasons for this rule, because the act of removal of most lip-type shaft seals is liable to damage them, and in a large percentage of cases effectively destroys their functional capabilities. A particular reinstalled seal may or may not leak, but a large percentage of reinstalled seals would leak, and since lip seals are usually relatively inexpensive both in comparison with the time it takes to install or reinstall them and in comparison with the equipment which the seal protects, reinstallation is generally considered risky, and it is economical to put in a new seal whenever an old seal has to be removed.

However, throwing old seals away and putting in new seals becomes expensive in some instances where relatively expensive seals are used. An example is a railroad journal box seal for tapered roller bearing installations, and there are other expensive lip seals in some installations. In such installations, interest has been lately expressed in reconditioning the expensive bearings, and in order to recondition the bearings, the seal must be removed. When the bearings have been reconditioned, the question arises whether the seal can be safely reinstalled. If the seal can be safely reinstalled, the savings are quite significant, but if the seal would leak after installation, the expensive bearings it protects would be damaged and the cost would far outweigh the cost of the seal. Rather than throw away every one of these relatively expensive lip seals, the present invention provides a test which determines whether the seal can be safely reinstalled, eliminating both guess work and waste. When a seal is placed on the proper test apparatus of this invention, it comes into engagement with several spring-loaded actuating pins; if the seal lip places a satisfactory radial load upon each pin, each pin closes a switch. The switches are in series, and if *all* of them close, a signal is given: e.g., a light goes on. An interval timer also is started to enable the tester to see that the light will stay on for a predetermined test interval. The seal is rejected if the light does not come on or if it does not stay lighted during the entire period of the test interval. If the seal passes the test, it may safely be reinstalled, subject only to visual inspection for tears or obvious serious blemishes.

Other objects and advantages of the invention will appear from the following description of a preferred embodiment.

Figure 1:
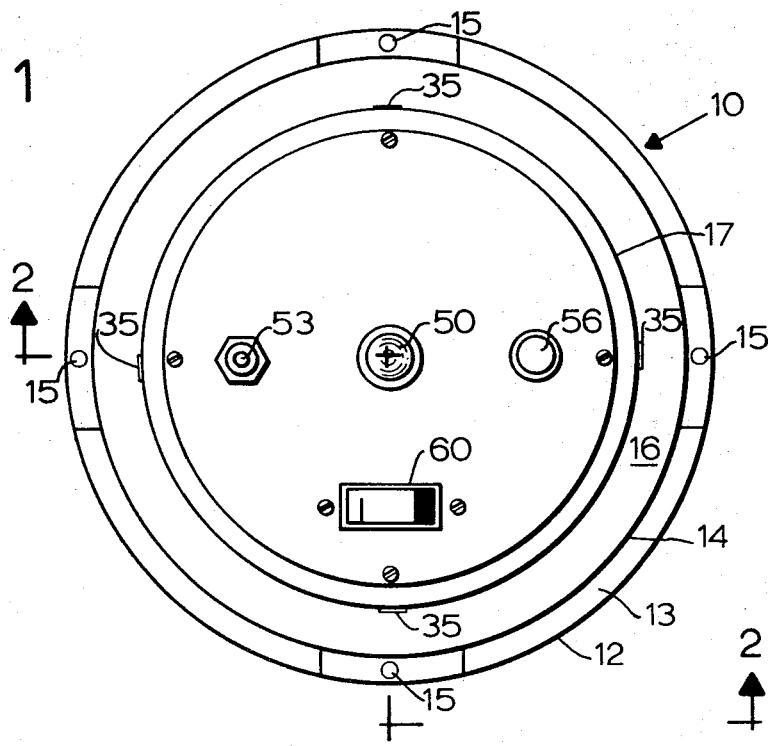
FIG. 1 is a top plan view of a seal test unit embodying the principles of the invention.
Figure 2:
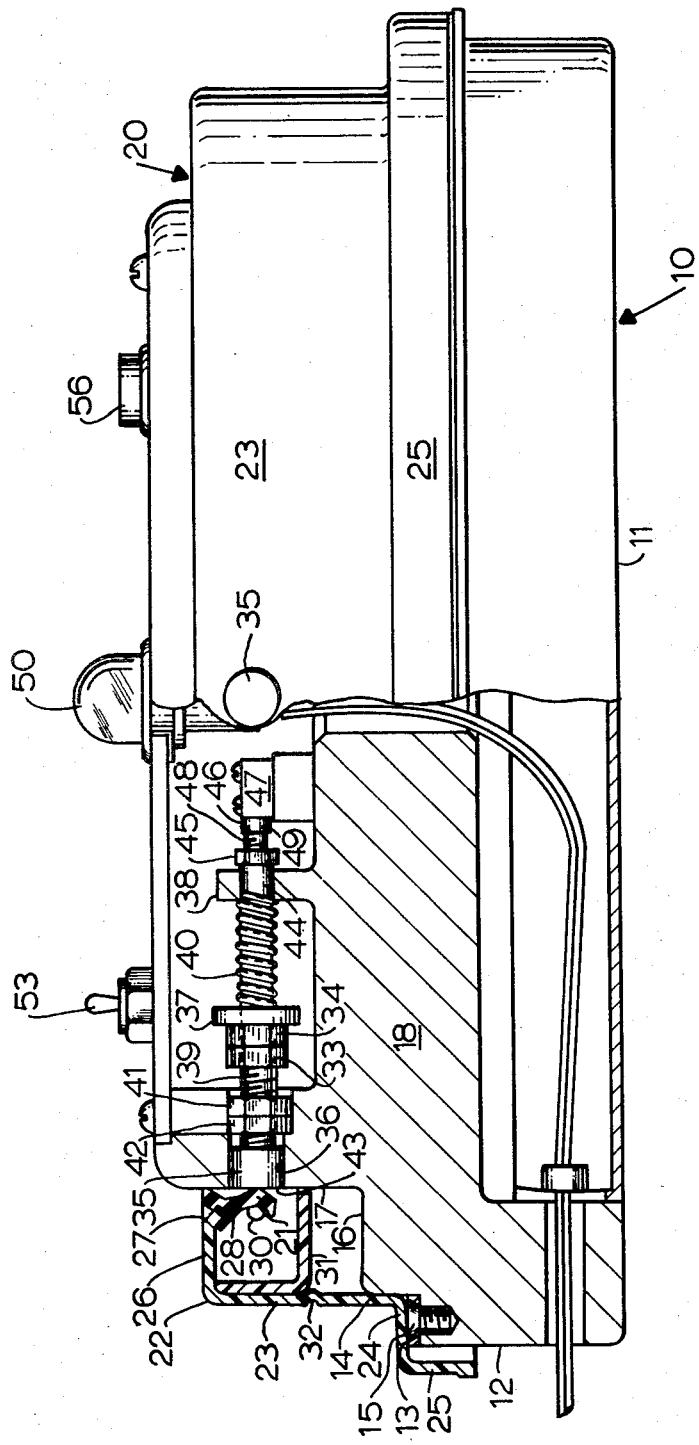
FIG. 2 is an enlarged view in elevation and partly in section of the unit of FIG. 1, taken along the line 2—2 in FIG. 1.

The seal test unit 10 shown in FIGS. 1 and 2 has exterior surface portions that simulate that of the seal's normal installed environment. Perpendicular to a flat base 11 is a cylindrical surface 12 which is joined by a step 13 to an inset cylindrical surface 14. A plurality of screws 15 on the step 13 enable precise adjustment of the location of a seal 20 to be tested. The cylindrical surface 14 is connected by another step 16 to a cylindrical surface 17 which corresponds to the shaft (or similar surface) which the main lip 21 of the seal 20 is to contact. The step 13, with its screws 15, and the surface 14 act to provide seating for the seal 20 by simulating the normal retention of the installed seal 20, though they may be somewhat different from the corresponding parts in the actual installation, and they assure perfect alignment of the seal 20 with respect to the lip 21 and the surface 17. All these surfaces are preferably on a unitary body 18.

Various types and sizes of seals may be tested, and differences in seals call for differences in the test unit. The seal 20 is used herein only as an example of one type of seal that is economically worth testing for possible replacement. The seal 20 has a main case 22 with a long cylindrical portion 23 followed at one end by an outward step 24 and a shorter cylindrical terminal portion 25. At the other end of the cylindrical portion 22 is a radial flange 26 leading in to a seal anchor portion 27 to which an elastomeric seal element 28 of suitable type is secured. The element 28 provides the main (or oil-retaining) lip 21, urged in this instance by a spring 30. Other types of anchorage for the element 28 to the case 22 may be used, for the precise structure of the seal is not important to the present invention, so long as the right dimensions obtain on the unit 10. An inner case or guard 31 may be held by a crimp 32 of the outer case 22, as shown. This structure, again, plays no function in the testing. The seal 20 should, of course, be visually inspected for obvious defects.

At a plurality of locations, preferably four spaced 90° around the circular periphery of the unit 10, the invention provides actuator pins 35 which extend radially through radial openings 36 in the body 18 and extend through the surface 17. To each of the pins 35 are secured two adjusting nuts 33 and 34 and a washer 37 that faces a lug 38 on the body 18, and a spring 40 is placed around the stem 39 of the pin 35 between the washer 37 and the lug 38 and bears against them. The pin 35 thus is normally forced outwardly at a predetermined load and resists being forced in. Another pair of adjusting nuts 41 and 42 enables precise location of the outer surface 43 of the pin 35. The inner end 44 of the pin 35 is tapped and into it is threaded a stud 48, on which is threaded a locking nut 45. The end 49 of the stud 48 bears against the lever arm 46 of a microswitch 47 or other suitable type of electrical switch. The idea is that the pin 35 can close the microswitch 47 only when a predetermined radial load is placed on the pin 35 by the seal lip 21. If the radial load of the lip 21 is insufficient to close the switch 47, the seal 20 is not safe to use, and therefore the test would result in its rejection, whereas if the seal 20 is safe to reuse, its lip 21 will place the desired load on the microswitch lever arm 46, and the switch 47 will be closed.

Figure 3:
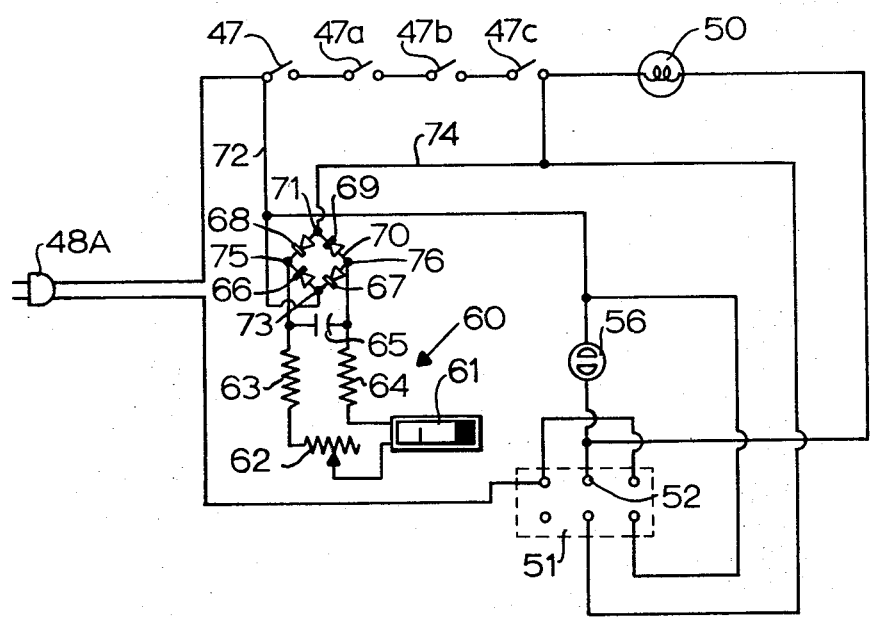
FIG. 3 is a diagram of an electrical circuit for the unit.

As shown in FIG. 3, several (e.g., four) microswitches 47, 47a, 47b, and 47c, are in series between a source 48A of current and a signal 50, such as light, which may be green or otherwise give some signal. The switches 47, 47a, 47b, and 47c and the light 50 are also in series with a double pole, double throw switch 51. The pole 52 of the switch 51 is thrown by a button 53 to a test position against a contact 54 to determine whether the light 50 is operative and against a contact 55 during actual testing of the seal. In parallel with the four switches 47, 47a, 47b, 47c, and 47d, is another light bulb 56 to indicate that the circuit is on.

A timing device 60 is used and is actuated upon the commencement of the test. The device 60 includes a microammeter 61 wired in series with an adjustable resistance 62 and two fixed resistors 63 and 64. Across the resistors 63 and 64 is a capacitor 65, preferably of the electrolytic type, which is charged by a network 70 of diodes 66, 67, 68, and 69 only when at least one microswitch 47, 47a, 47b, or 47cis open, since one end 71 of the network is connected by a lead 72 to the input side of the switch 47, and the other end 73 of the network is connected by a lead 74 to the output side of the microswitch 47c. The two sides 75 and 76 of the network 70 are connected respectively to the resistors 63 and 64 and are crossed by the capacitor 65. When all of the microswitches 47, 47a, 47b, and 47c are closed, the current is shunted around the network 70 by what is really a short circuit. Thus the capacitor 65 then begins to discharge through the resistors 63, 62, and 64 and the meter 61. The resistor 62 enables adjustment of the RC time constant governing discharge of the capacitor 65. During discharge, the meter 61 indicates that discharge is going on.

Thus, if the light 50 comes on at all, this means that all the microswitches 47, 47a, 47b, and 47c have been closed by the seal lip 21 having exerted the required amount of pressure, and at the same time the timing device 60 starts a time interval going. At the end of that time, the meter 61 signals the conclusion of the time interval, and if the light 50 is still on, the test is successful. It is then safe to reinstall the seal 20, but if the seal 20 is not safe to use the light 50 will not stay on for the whole interval or will not come on in the first place. Usually the test interval is about fifteen seconds, but it may be adjusted as described to any desired interval.

The invention may also be used as a safety check for new seals.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting

We claim:

1. A device for indicating whether a lip-type of shaft seal exerts a required lip pressure and is safe for installation, including in combination:

a cylindrical shaft-simulating surface having a plurality of radial openings therethrough, a test pin in each said opening extending radially toward the center, pressure means urging each said test pin radially outwardly, switch means for each said pin actuated only when the pressure exerted radially inwardly thereon is above a predetermined level, as it will be when the shaft seal being tested is installed on said shaft-simulating surface and is safe for installation, and signal means actuated only when all said switch means are actuated.

2. The device of claim 1 having timing means actuated upon actuation of all said switch means and means indicating the conclusion of a timed period initiated and closed by said timing means.

3. The device of claim 1 wherein said timing means comprises an R-C circuit having a capacitor that begins discharge when all said switches are actuated and a current meter indicating flow of current during discharge of said capacitor.